United States Patent [19]

Steinbrecher

[11] Patent Number: 5,566,173
[45] Date of Patent: Oct. 15, 1996

[54] COMMUNICATION SYSTEM

[75] Inventor: Donald H. Steinbrecher, Brookline, Mass.

[73] Assignee: Steinbrecher Corporation, Burlington, Mass.

[21] Appl. No.: 322,101

[22] Filed: Oct. 12, 1994

[51] Int. Cl.$^6$ .................................................. H04B 7/212
[52] U.S. Cl. ..................... 370/79; 370/85.13; 370/95.1; 370/60.1; 379/58
[58] Field of Search .............................. 370/60, 60.1, 79, 370/85.13, 85.14, 94.1, 94.2, 95.1; 379/58, 59; 455/33.1

[56] References Cited

U.S. PATENT DOCUMENTS

| | | | |
|---|---|---|---|
| 5,060,227 | 10/1991 | Finely et al. | 370/79 |
| 5,121,391 | 6/1992 | Paneth et al. | 370/95.1 |
| 5,140,590 | 8/1992 | Gertsman et al. | 370/79 X |
| 5,184,347 | 2/1993 | Farwell et al. | 370/94.1 |
| 5,363,369 | 11/1994 | Hemmady et al. | 370/60 |
| 5,375,118 | 12/1994 | Rao et al. | 370/60.1 |
| 5,388,258 | 2/1995 | Larsson et al. | 370/58.2 X |

*Primary Examiner*—Douglas W. Olms
*Assistant Examiner*—Russell W. Blum
*Attorney, Agent, or Firm*—Fish & Richardson, P.C.

[57] ABSTRACT

A communication system having a communication network, such network having a plurality of communication paths interconnected at various nodes of the network. A plurality of subscriber units is adapted to exchange information through the network. A computer is provided having a processor and a memory, such memory being adapted to store programs to enable the processor to control the information exchange among the plurality of subscriber units. The memory stores an operating system and at least one applications program, the operating system being adapted to manage interfacing between the application program and the system. One of the application programs enables the processor to convert a modulation format of one of the subscriber units into another information transmission protocol of the network.

2 Claims, 3 Drawing Sheets

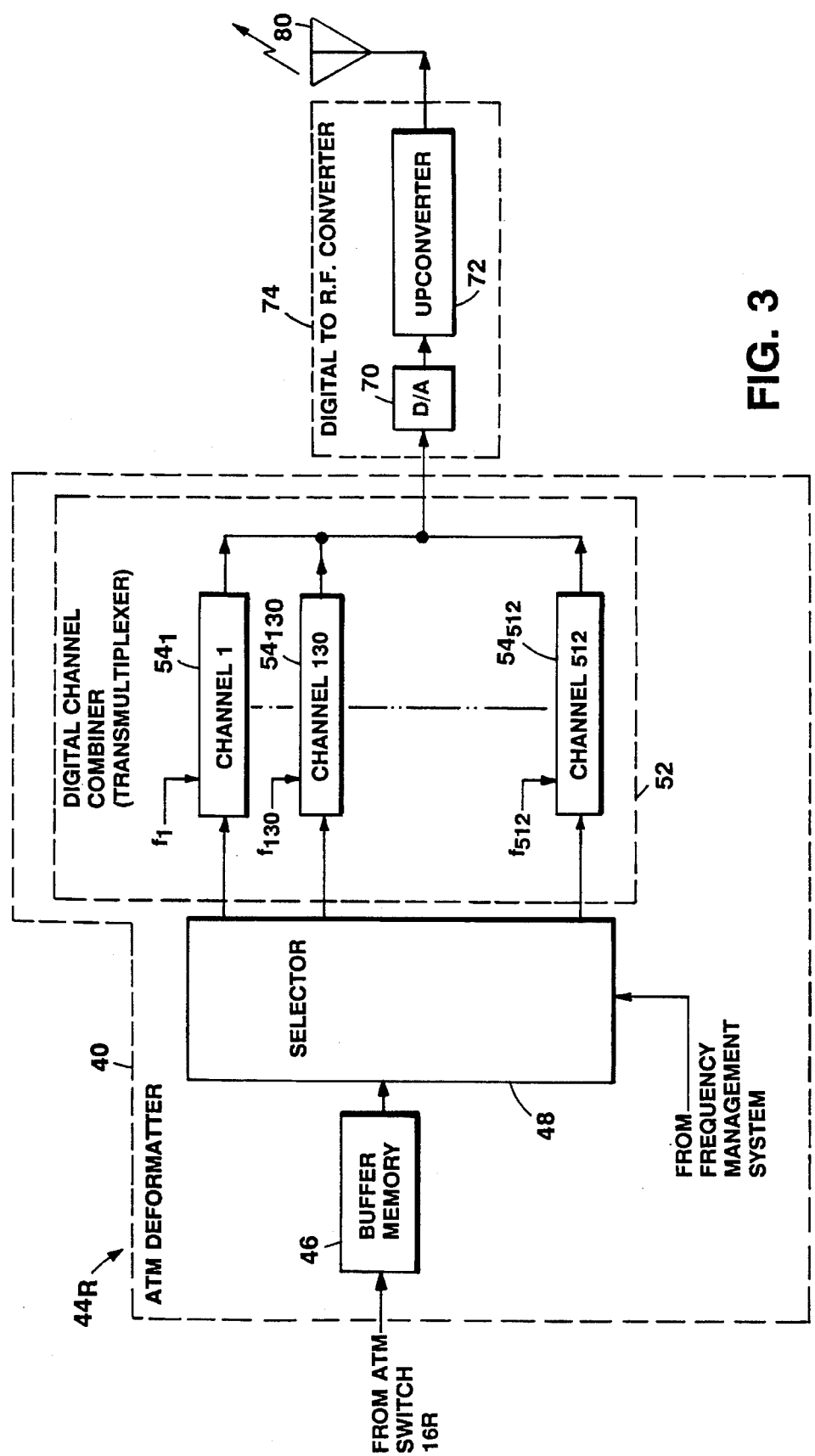

COMMUNICATION SYSTEM

BACKGROUND

This invention relates generally to global area communication systems and more particularly to wireless mobile communication systems.

As is known in the art, existing global communication systems enable a large number of subscribers to communicate and exchange a wide variety of information. The communication system includes a routing, or switching network. Typically, the network includes a plurality of communication paths interconnected at various nodes internal to the network. More particularly, the communication paths of the network include optical fiber, wired telephone links, and satellite links.

A switch is located at each network node, including nodes internal to the network as well as network input/output nodes at interfaces to, and from, the network. Information may be passed from a transmitting subscriber unit linked to a network input/output node to a receiving subscriber unit linked to another network input/output node by means of the switches at the network nodes. The information introduced to the network is formatted into the transmission protocol of the network. Routing through the network is typically under the control of a network management system (NMS). That is, each switch is controlled by the NMS to properly route the information through the network.

More particularly, in one such network, the information passes therethrough as digital information in a so-called asynchronous transfer mode (ATM) transmission protocol. Such a network is sometimes referred to as an ATM network. Thus, at each node is a multi-input/output port ATM switch. Each one of the switch ports has a unique address. Data coupled to one of the input/output port passes to another one of the input/output port in accordance with configuration of the switches in the network. The switch is configurable by control signals fed to the switch by the NMS. With such an ATM protocol, information is transmitted through the ATM network in packets of binary data. At each node, the packet includes a five byte header containing the address of the next "destination" node and forty-eight bytes of data. Thus, data passes from source node to destination node specified by the address portion of the packet. Packets travelling from the source node to destination node subsequently follow the unique path initialized by the network management system. In this way, the network management system addresses proper ones of the switches and provides such addressed switches with proper configurations to thereby properly route the information from the transmitting subscriber unit to the receiving subscriber unit.

SUMMARY

In accordance with one aspect of the invention, a communication system is provided adapted for wireless subscribers, such system having a network for routing carrier modulated information therethrough from a transmitting wireless subscriber.

With such arrangement, because the network is adapted to route therethrough carrier modulated information, a network is provided which is functionally transparent to the modulation, and hence is able to operate with a wide variety of current air standards, as well as with future air standards.

In accordance with another aspect of the invention, a communication system is provided adapted for wireless subscribers, such system having a network for routing carrier modulated information therethrough received from a transmitting wireless subscriber, such network converting the received form of modulation to another form of modulation, such modulation converted information being routed through the network to a destination node of the network. With such an arrangement, transmitting and receiving subscribers using different forms of modulation are able communicate through the network.

In accordance with still another aspect of the invention, a communication system is provided adapted for wireless subscribers, such network includes a computer adapted to convert the modulation received from a wireless subscriber to another form of modulation in accordance with a program introduced into the computer. With such an arrangement the network is adapted to operate with modulations which, while not present air standards, may become air standards in the future.

DESCRIPTION

Figure 1:
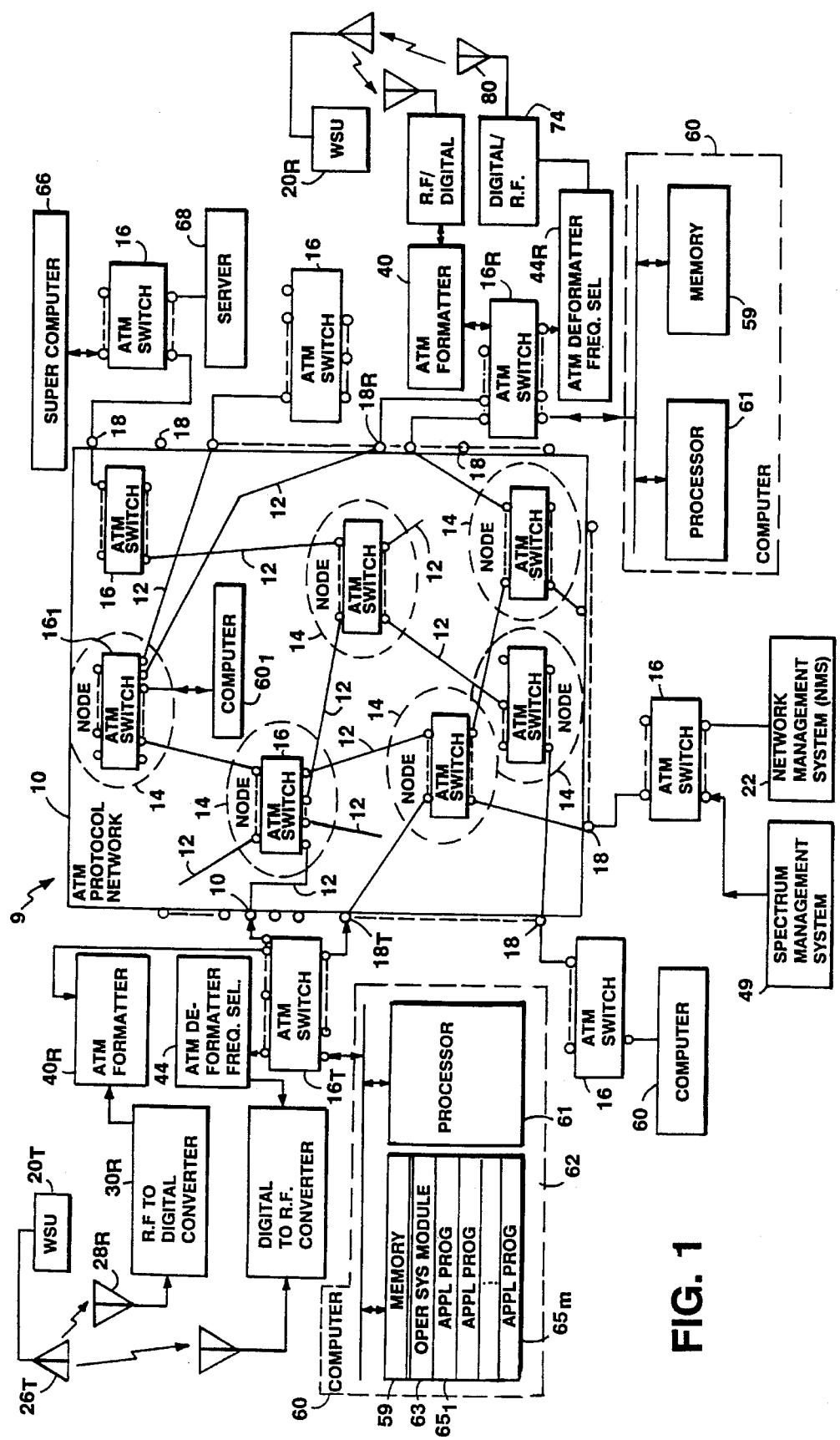
FIG. 1 is a block diagram of a communication system, according to the invention.

Referring now to FIG. 1, a communication system 9 is shown to include a network 10. Here network 10 operates with asynchronous transfer mode (ATM) protocol. Such network 10 includes a plurality of communication paths 12 interconnected at various nodes 14 internal to the network 10. More particularly, the communication paths 12 of the network 10 include, inter alia, optical fiber, wired telephone links, and satellite links. The large number of paths 12 in the network 10, (i.e., "cloud") provides a virtually limitless number of communication paths between any two nodes 14 internal to the network 10 as discussed in my paper entitled "A Generic Telecommunications Infrastructure for UPC/PCS" published in the "Proceedings of the Second International Conference on Universal Personal Communications" held in Ottawa, Canada on May 12, 1993, the contents of which are hereby incorporated by reference.

The network 10 links one information network node 14 to another network node 14 via an ATM switch 16 located at each network node 14, including nodes 14 internal to the network 10 as well as network input/output nodes 18 at the interface to, and from, the network 10. Routing through the network 10 is here under the control of a network management system (NMS) 22. More particularly, the information introduced into the network 10 passes through the network 10 as digital information in a so-called asynchronous transfer mode (ATM) transmission protocol. At each node 14 is a multi-input/output port ATM switch 16. Each one of the ATM switches 16 has a unique address. The information coupled to one of the input/output ports of an ATM switch 16 passes to another one of the input/output port of such ATM switch 16 in accordance with the configuration of the switch. The switch is configurable by control signals fed to the switch by the NMS 22. With such an ATM protocol, information is transmitted through the ATM network 10 in packets of binary data. At each node 16, the packet includes a five byte header containing the address of the next "destination" node and forty-eight bytes of data. Thus, data passes from source node 14 to destination node 14 specified by the address portion of the packet. Packets travelling from the source node 14 to destination node 14 sequentially follow the unique path initialized by the network management system. In this way, the network management system 22 addresses proper ones of the ATM switches 16 and provides such addressed switches 16 with proper configurations to thereby properly route the information between ATM switches 16 at the input/output nodes 18 to, or from, the network 10. That is, each switch 16 is controlled by the NMS 22 to properly route the information through the network 10.

Network 10 is adapted to operate with wireless subscriber units (WSUs) 20 coupled to, and from, the network 10 by radio frequency (RF) energy. Information is transmitted from a transmitting section of a wireless subscriber unit $20_T$ coupled to a network input/output switch $16_T$ at input/output nodes 18 to a receiving wireless subscriber unit $20_R$ coupled to another network input/output switch $16_R$ at input/output node $18_R$.

That is, the wireless mobile transceiver unit $20_T$, such as, for example, mobile cellular telephones modulate a radio frequency (RF) carrier in accordance with the information to be exchanged. The RF carrier associated with the wireless subscriber unit $20_T$ is a carrier frequency associated with an assigned one of 512 channels; here, for example, channel 213. The total bandwidth of the 512 channels is here 15.36 MHz. Thus, each one of the 512 channels has a bandwidth of here 30 KHz.

Figure 2:
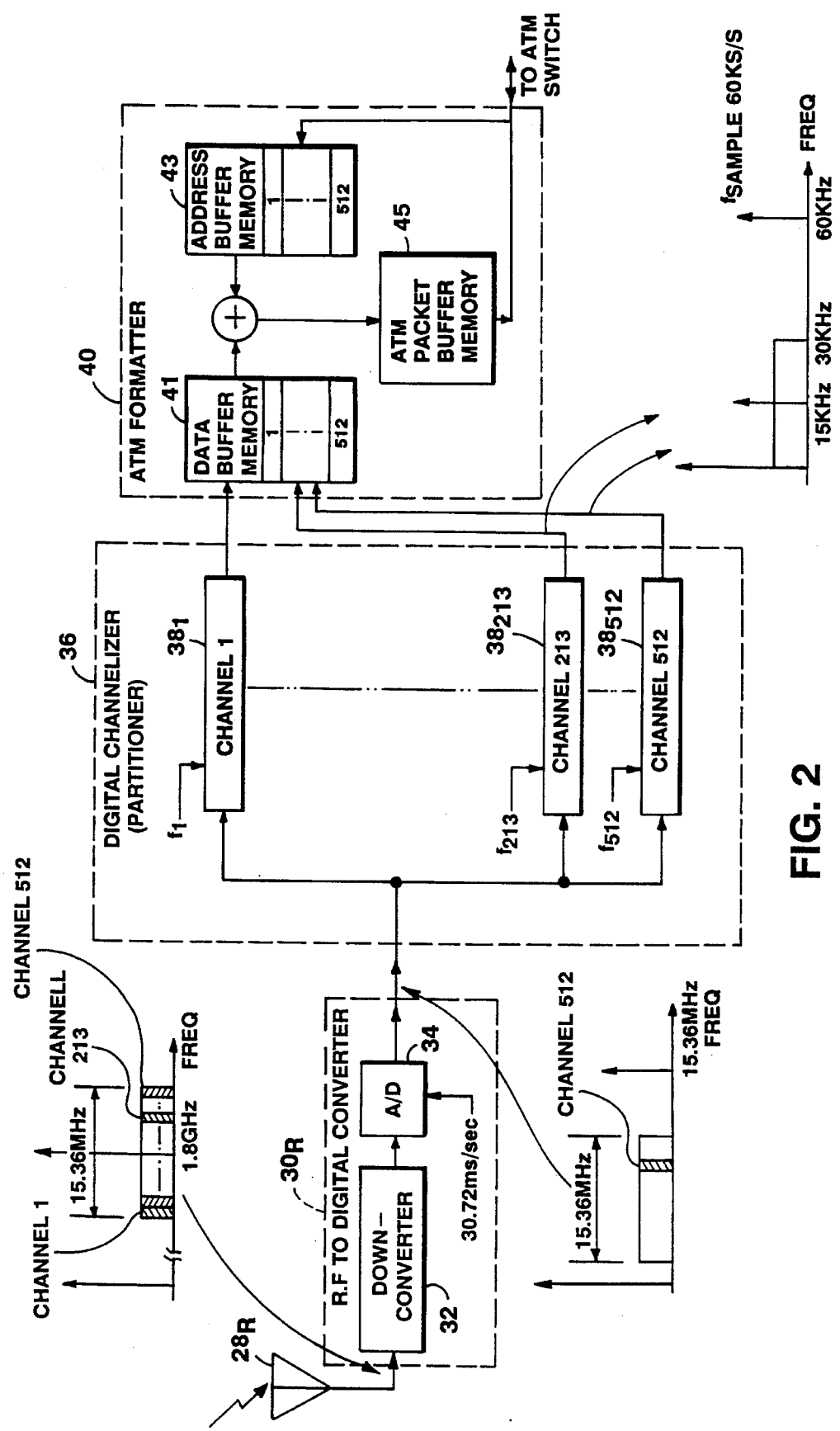
FIG. 2 is a block diagram of a radio frequency (RF) converter and ATM formatter used in the communication system of FIG. 1; and, FIG. 3 is a block diagram of an ATM deformatter and analog to RF converter used in the communication system of FIG. 1.

The modulated RF carrier is transmitted from wireless subscriber unit $20_T$, via antenna $26_T$. Such transmitted modulated RF carrier is received by a near by receiving antenna, here antenna $28_R$. The modulated RF carrier received by antenna $28_R$ is fed to a radio frequency to digital converter 30, here radio frequency to digital converter $30_R$, coupled to the antenna $28_R$. Here, the radio frequency to digital converters 30 are ACCUVERTER® converters sold by Steinbracher Corporation located at Burlington, Mass. Referring also to FIG. 2, the modulated RF carrier signal received by antenna $28_R$ is fed to a frequency downconverter 32. The downconverter 32 translates, or shifts, the RF carrier frequency from, here, in this example, a carrier frequency of 1.8 GHz to 7.68 MHz, as indicated. The frequency downconverted signal is fed to a analog to digital (A/D) converter 34. The A/D converter 34 takes, here sixteen bit samples of the downconverter signal at the Nyquist sampling rate, here at a rate of 30.72 million samples per second; i.e., twice the 15.36 MHz bandwidth of the 512 channels.

The digitized samples produced by the A/D converter 34 are fed to a digital channelizer, or partitioner 36. One such partitioner 36 which may be used may include a poly-phase filter. Poly-phase filters are described by f. j. harris in an article presented at the ASKOMAR Conference on Signals, Systems, and Computers at Pacific Grove, Calif. 30 Oct. to 1 Nov. 1989, entitled "On the Relationship Between Multi-Rate Polyphase Filters and Windowed Overlapped FFT Processing" and published in the Proceedings of such Conference. Partitioner 36 may be considered as, in effect, including a bank of 512 digital heterodyning channels $38_1$–$30_{512}$ as indicated. Each one of the digital heterodyning channels $38_1$–$30_{512}$ may be considered as heterodyning the signal produced by the A/D converter 34 with a corresponding one of 512 local oscillator frequencies $f_1$–$f_{512}$, respectively, to translate the frequency of any received downconverted signal in any one of the 512 channels to a 30 KhZ band of frequencies having the same center frequency. Thus, here, the signal received in any one of the 512 channels appears in a 30 KHz band of frequencies centered at 15 KHz. Further, because the A/D converter 34 takes samples of the downconverter signal at, here, at a rate of 30.72 million samples per second, the signals in each of the 512 channels are samples at a 60 KHz rate; twice the 30 KHz bandwidth of each one of the 512 channels.

Signals produced by the channels $38_1$–$38_{512}$ are fed to an ATM formatter 40. The ATM formatter 40 formats the data from any of the 512 channel $38_1$–$38_{512}$ having received information, here channel $38_{213}$, for example, into ATM packets, each packet having an address portion and a data portion. Thus, the ATM formatter 40 encodes each signal into the proper protocol for transmission over the ATM network 10 via ATM switch $16_T$. Forty-eight bytes of ATM formatted data are stored in a data buffer memory 41. During call set up, the network management system 22 establishes an address, or header, for a channel having information, here channel 213. Thus, a five byte header fed to address buffer memory 43 is added to the forty-eight bytes successive bytes from the data buffer memory 41 to form the first ATM 53 byte packet. The packet is stored in an ATM packet buffer memory 45 before until accepted by the connected ATM switch $16_T$. The address portion is assigned to the packet by the network management system 22 (FIG. 1) to properly route the packet from "source" node to "destination" node, and so forth, through the ATM network switches 16 in the manner described above. Thus, the ATM formatted data is then fed to ATM switch $16_T$ at the input/output node $18_R$ (FIG. 1).

In the case where the wireless subscriber unit $20_T$ and wireless subscriber unit $20_R$ are operating with the same, present day, form of modulation, or "air standard", once at the final, ATM switch $16_R$, the ATM formatted data is fed to an ATM deformatter 44 connected to the final, network interface ATM switch, here deformatter $44_R$ connected to ATM switch $16_R$. Referring now also to FIG. 3, deformatter $44_R$ includes a buffer memory 46 for storing the 48 byte information portion of the ATM packet; the 5 byte address portion being removed. The information portion of the packet is fed to a channel selector 48, as shown. Also fed to the selector 48 is a control signal from a spectrum management system 49 which determines the one of the 512 channels used by the selected wireless remote unit (WSU), here WSU $20_R$ during the call set-up procedure. The output of the selector 48 is fed to an up-convert digital channel combiner, or transmultiplexer, section 52. Combiner section 52, is similar to partitioner 36, except that combiner section 52 translates the signals produced from the buffer memory 46, which have a bandwidth of 30 KHz centered at a frequency of 15 KHZ, to band of frequencies of 30 KHZ, but at a frequency centered at a frequency related to the carrier frequency associated with the called wireless subscriber unit, here WSU $20_R$; and more particularly, to the operating channel frequency associated with wireless subscriber unit $20_R$, here, for example, channel 130. Thus, channelizer 52 here includes a bank of 512 digital heterodyning channels $54_1$–$54_{512}$, as indicated. Each one of the digital heterodyning channels $54_1$–$54_{512}$ may be considered as heterodyning the signal produced by the buffer memory 46 with a corresponding one of 512 local oscillator frequencies $f_1$–$f_{512}$, respectively, to translate the frequency of any received downconverted signal in any one of the 512 channels to a 30 KhZ band of frequencies having different center frequencies. The output of the buffer memory 46 is passed to the one of the 512 digital heterodyning channels $54_1$–$54_{512}$ selected by the frequency management system so that, after being upconverted in frequency, will, after passing through a digital to analog converter 70 and up converter 72 of digital to analog converter 74, be centered at the carrier frequency associated with the called wireless subscriber unit, here WSU $20_R$. The upconverted, modulated RF carrier signal is transmitted to WSU $20_R$ via antenna $26_R$. The digital to RF converter 74 is an ACCUVERTER® converter.

In the case where the wireless subscriber unit $20_T$ and wireless subscriber unit $20_R$ are operating with different types of modulation, or the modulations which, while not available today may be available in the future, a computer 60 is provided at selected ones of the ATM switches 16, as shown. Each computer 60 includes a memory 59 and a processor 61, here a digital signal processor (DSP), interconnected to each other and to a input/output port of the ATM switch 16, as shown 61. The memory 59 is adapted to store an operating system. The operating system manages the interfacing between a variety of application programs $65_1$–$65_m$ stored and the components and elements of system 10. Here, one of the stored applications programs $65_1$–$65_m$ is a demodulate/modulate module. If the transmitting wireless subscriber unit $20_T$ is transmitting with frequency modulation (FM) and the receiving wireless subscriber unit $20_R$ is adapted to operate with TDMA modulation, the DSP 61 demodulates the FM modulation input to the computer 60, converts it to pulse code modulation (PCM) adapted for the ATM protocol for acceptance by ATM switch $16_T$. The information then passes through the network 10 to another computer, here, computer $60_1$ where an application program stored therein converts the PCM modulation into TDMA modulation. The converted information is again accepted by the ATM switch $16_1$, connected to computer $60_1$. The converted information then passes to ATM switch $16_R$, ATM deformatter $44_R$ and digital to RF converter 74.

The operating system enables application programs to be easily written for enable demodulation and modulation of future type of modulation, air standards.

Thus, the network 10 is, in effect, transparent to the type of modulation used by subscribers. The computer 60 operates as a bridge, or network operating system (operating system) and, thus, transforms the ATM network 10, or "cloud" into a standard air interface for the subscriber units, i.e. the subscriber units 20 communicate over the ATM cloud (FIG. 1) as though they were communicating signals with one another directly over the air.

The communication system of FIG. 1 also provides an enabling technology for the development of various new applications. For example, a supercomputer 66 may be included to interfaced with the ATM network 10 and accessed by any operating system to provide human language translation (e.g., Japanese to English) of the signals communicated between subscriber units.

In other applications, servers 68 (FIG. 1) supplying a continuous source of information of common interest to several subscriber units may be added to the ATM network 10. For example, the server 68 may transmit a local radio station continuously over the network 10. A particular subscriber unit can then inform the network management system through a local connected computer 60 that it wishes to receive the radio station broadcast. The network management system sends appropriate software enabling the local computer to receive the radio broadcast from the server and to transmit the broadcast to the subscriber unit. In addition, the software enables the computer to collect money from the subscriber unit for this service. The computer also enables communications between separate ATM networks to be transmitted over the air by an "ATM over the air" scheme. An RF to digital converter receiving ATM packets from one computer in a first ATM network may, for example, transmit the signals over the air to a digital to RF converter through another computer to a second ATM network.

A large number of channels in the network, (i.e., "cloud") provide a virtually limitless number of communication paths between any two nodes internal to the network. As noted above, the word "cloud" is used to describe any contiguous network environment, however small or large, throughout which a high-speed data exchange can be effected. Thus, a "cloud" is a network environment which links one information network node to another network node. The "cloud" comprises a cluster of any number of internal linked together in a mesh, usually sparse, by high-speed digital-transmission data highways.

Other embodiments are within the following claims. For example, in addition to wireless subscriber units employing an air standard, wired subscriber units can be connected to the computer through wired links in the ATM networks. Each computer can then format signals from the wired units for communication over the ATM network.

What is claimed is:

1. A communication system comprising:

a communication network having a plurality of communication paths interconnected at various nodes of the network;

a plurality of subscriber units adapted to exchange information through the network;

a computer coupled to the communication network, such computer having a processor and a memory, such memory being adapted to store programs to enable the processor to control the information exchange among the plurality of subscriber units independent of the subscriber unit information exchange protocol;

wherein the memory stores an operating system and at least one applications program, the operating system being adapted to manage interfacing between the applications program and the system; and wherein one of the application programs enables the processor to convert a modulation format of one of the subscriber units into an information exchange protocol of the network.

2. A communication system, comprising:

a communication network having a plurality of communication paths interconnected at various nodes of the network;

a plurality of wireless subscriber units adapted to exchange information through the network, such subscriber units operating with different modulation formats;

a computer, coupled to the communication network, such computer having a processor and a memory, such memory being adapted to store an application program to enable the processor to control the information exchange between one of the subscriber units operating with one modulation format and another one of the subscriber units operating with a different modulation format; and wherein the memory stores an operating system and at least one applications program, the operating system being adapted to manage interfacing between the application program and the system.

\* \* \* \* \*